United States Patent
Gibon et al.

(10) Patent No.: US 9,721,695 B2
(45) Date of Patent: *Aug. 1, 2017

(54) THERMOPLASTIC MOLDING COMPOSITION

(75) Inventors: Cecile Gibon, Mannheim (DE); Xin Yang, Bensheim (DE); Christof Kujat, Neustadt (DE); Martin Weber, Maikammer (DE); Laszlo Szarvas, Ludwigshafen (DE); Daniel Klein, Mannheim (DE); Petra Poetschke, Dresden (DE); Beate Krause, Meißen (DE)

(73) Assignee: BASF SE, Ludwigshafen (DE)

( * ) Notice: Subject to any disclaimer, the term of this patent is extended or adjusted under 35 U.S.C. 154(b) by 908 days.

This patent is subject to a terminal disclaimer.

(21) Appl. No.: 13/332,424

(22) Filed: Dec. 21, 2011

(65) Prior Publication Data
US 2012/0153233 A1 Jun. 21, 2012

Related U.S. Application Data

(60) Provisional application No. 61/425,290, filed on Dec. 21, 2010.

(51) Int. Cl.
*H01B 1/24* (2006.01)
*B82Y 30/00* (2011.01)

(52) U.S. Cl.
CPC ............... *H01B 1/24* (2013.01); *B82Y 30/00* (2013.01)

(58) Field of Classification Search
CPC ............................................. H01B 1/24
USPC .................................. 252/502, 506, 511
See application file for complete search history.

(56) References Cited

U.S. PATENT DOCUMENTS

| | | | | |
|---|---|---|---|---|
| 7,601,771 B2 * | 10/2009 | Schmidt | ............ | C08K 5/19 524/100 |
| 2002/0049285 A1 * | 4/2002 | Abe | ............ | 525/420 |
| 2004/0167264 A1 * | 8/2004 | Vathauer | ............ | C08L 51/04 524/401 |
| 2004/0262581 A1 | 12/2004 | Rodrigues | | |
| 2006/0052528 A1 | 3/2006 | Ottenheijm | | |
| 2006/0100323 A1 | 5/2006 | Schmidt et al. | | |
| 2008/0057246 A1 * | 3/2008 | Schwitter et al. | ............ | 428/36.6 |
| 2008/0114105 A1 | 5/2008 | Hell et al. | | |
| 2009/0023851 A1 | 1/2009 | Bierdel et al. | | |
| 2010/0019210 A1 | 1/2010 | Weber et al. | | |
| 2010/0084616 A1 * | 4/2010 | Brule | ............ | H01B 1/24 252/511 |
| 2011/0306701 A1 | 12/2011 | Weber et al. | | |
| 2013/0214211 A1 | 8/2013 | Lehmann et al. | | |

FOREIGN PATENT DOCUMENTS

| | | |
|---|---|---|
| DE | 2546810 A1 | 4/1977 |
| JP | S52-050351 A | 4/1977 |
| JP | 2005 220316 A | 8/2005 |
| JP | 2005532440 A | 10/2005 |
| JP | 2006526685 A | 11/2006 |
| JP | 2006338492 A | 12/2006 |
| JP | 2009 155436 A | 7/2009 |
| JP | 2009-544780 A | 12/2009 |
| JP | 2010031107 A | 2/2010 |
| JP | 2010-090372 A | 4/2010 |
| JP | 2010150554 A | 7/2010 |
| JP | 2010173739 A | 8/2010 |
| JP | 2010-530925 A | 9/2010 |
| JP | 2010229232 A | 10/2010 |
| JP | 2010270269 A | 12/2010 |
| JP | 2014-502289 A | 1/2014 |
| KR | 2010 0130368 | * 12/2010 |
| KR | 20100130368 A | 12/2010 |
| WO | WO-2008006422 A2 | 1/2008 |
| WO | WO-2011/009798 A1 | 1/2011 |

OTHER PUBLICATIONS

Database WPI, week 701110, Thomson Scientific, London, GB An 2010-Q67112, XP002648250.
International Search Report for PCT/EP2011/073181 (Jan. 19, 2012).

* cited by examiner

*Primary Examiner* — Tanisha Diggs
(74) *Attorney, Agent, or Firm* — Drinker Biddle & Reath LLP

(57) ABSTRACT

The thermoplastic molding composition comprises, based on the thermoplastic molding composition,
a) at least one polyamide, copolyamide or a polyamide-comprising polymer blend as component A,
b) from 0.1 to 10% by weight of carbon nanotubes, graphenes or mixtures thereof as component B,
c) from 0.1 to 3% by weight of ionic liquids as component C,
wherein the thermoplastic molding composition does not comprise any polyamide-12 units.

9 Claims, No Drawings

THERMOPLASTIC MOLDING COMPOSITION

CROSS-REFERENCE TO RELATED APPLICATIONS

This application claims the benefit of U.S. Provisional Application 61/425,290, filed Dec. 21, 2010, which is incorporated by reference.

BACKGROUND OF THE INVENTION

The invention relates to a thermoplastic molding composition which comprises polyamide and carbon nanotubes, graphenes or mixtures thereof and additionally ionic liquids.

The use of carbon nanotubes in specialty plastics in combination with ionic liquids is known per se.

WO 2008/006422 relates to the use of ionic liquids or solutions of metal salts in ionic liquids as antistatics for plastics. The plastics are, in particular, polyurethanes. References to other plastics which can be used are absent.

JP-A-2009-155436 relates to carbon nanotube dispersions and resin compounds and also resin moldings comprising carbon nanotube dispersions. The carbon nanotubes are firstly reacted with silane-based surface-active substances which are said to allow improved bonding to the polymer resin. In addition, the silane-based surface-active substances are used together with an ionic liquid. The proportion of the ionic liquid is, according to the examples, about 6.25% by weight. Polyamides such as Nylon-6 are included in a list of thermoplastic resins which can be used. The salt melt (ionic liquid) is used as dissolution medium in which the silane-based surface-active substance can bond effectively to the carbon nanotubes.

JP-A-2005-220316 relates to electrically conductive components for use in electrophotographic equipment and the production thereof. The electrically conductive components are made up of a matrix polymer, a fibrous, electrically conductive filler such as carbon nanotubes and an ionic liquid. Rubbers are used as matrix polymer.

DETAILED DESCRIPTION OF THE INVENTION

It is an object of the invention to provide polyamide molding compositions comprising carbon nanotubes, graphenes or mixtures thereof, which molding compositions have an improved conductivity or in which the content of carbon nanotubes, graphenes or mixtures thereof can be reduced while maintaining the conductivity.

The object is achieved, according to the invention, by a thermoplastic molding composition comprising, based on the thermoplastic molding composition,
a) at least one polyamide, copolyamide or a polyamide-comprising polymer blend as component A,
b) from 0.1 to 10% by weight of carbon nanotubes, graphenes or mixtures thereof as component B,
c) from 0.1 to 3% by weight of ionic liquids as component C,
wherein the thermoplastic molding composition does not comprise any polyamide-12 units.

According to the invention, it has been found that a combination of small amounts of ionic liquids with carbon nanotubes, graphenes or mixtures thereof leads to a synergistic effect which gives a high conductivity even at low contents of carbon nanotubes, graphenes or mixtures thereof.

The proportion of ionic liquids in the thermoplastic molding composition is preferably from 0.1 to 1.5% by weight, in particular from 0.3 to 1.2% by weight.

The proportion of carbon nanotubes, graphenes or mixtures thereof as component B is preferably from 0.1 to 7% by weight, particularly preferably from 0.5 to 4% by weight, based on the thermoplastic molding composition.

Ionic Liquid Component C

The invention is not restricted to specific ionic liquids as component C; it is possible to use all suitable ionic liquids, including mixtures of different ionic liquids.

According to the definition by Wasserscheid and Keim in: Angewandte Chemie 2000, 112, 3926-3945, ionic liquids are salts which melt at relatively low temperatures and have a nonmolecular, ionic character. They are liquid even at relatively low temperatures and there have a relatively low viscosity. They have very good solvent capabilities for a large number of organic, inorganic and polymeric substances. In addition, they are generally nonflammable, noncorrosive and have no measurable vapor pressure.

Ionic liquids are compounds which are made up of positive and negative ions but are overall uncharged. The positive ions and also the negative ions are predominantly monovalent, but multivalent anions and/or cations, for example anions or cations having from one to five, preferably from one to four, more preferably from one to three and very particularly preferably from one to two, electric charges per ion are also possible. The charges can be present in various localized or delocalized regions within a molecule, i.e. in a betaine-like fashion, or else as separate anion and cation. Preference is given to those ionic liquids which are made up of at least one cation and at least one anion.

Ionic liquids have a more complex solvent behavior than traditional aqueous and organic solvents since ionic liquids are salts and not molecular nonionic solvents. Ionic liquids are preferably present in the liquid phase in a temperature range from −70 to 300° C.

Preference is given to ionic liquids having a very low melting point, in particular below 150° C., more preferably below 100° C., particularly preferably below 80° C.

The ionic liquid which functions as agent for improving the conductivity can be selected so that it is largely chemically inert toward the materials participating in the compounding.

The ionic liquids are typically made up of an organic cation which is frequently obtained by alkylation of a compound, for example of imidazoles, pyrazoles, thiazoles, isothiazoles, azathiazoles, oxothiazoles, oxazines, oxazolines, oxazaboroles, dithiozoles, triazoles, selenozoles, oxaphospholes, pyrroles, boroles, furans, thiophenes, phospholes, pentazoles, indoles, indolines, oxazoles, isoxazoles, isotriazoles, tetrazoles, benzofurans, dibenzofurans, benzothiophenes, dibenzothiophenes, thiadiazoles, pyridines, pyrimidines, pyrazines, pyridazines, piperazines, piperidines, morpholones, pyrans, anolines, phthalazines, quinazolines, quinoxalines and combinations thereof.

The cation of the ionic liquid is particularly preferably selected from the group consisting of quaternary ammonium cations, phosphonium cations, imidazolium cations, H-pyrazolium cations, pyridazinium ions, pyrimidinium ions, pyrazinium ions, pyrrolidinium cations, guanidinium cations, 5- to at least 6-membered cations which comprise at least one phosphorus or sulfur atom, the 1,8-diazabicyclo[5.4.0]undec-7-enium cation and the 1,8-diazabicyclo[4.3.0]non-5-inium cation and also oligomers and polymers comprising these cations.

The anionic part of the ionic liquid can be made up of inorganic or organic anions. Typical examples are halides, $BX_4^-$, $PF_6^-$, $AsF_6^-$, $SbF_6^-$, $NO_2^-$, $NO_3^-$, $SO_4^{2-}$, alkylsulfates, $BR_4^-$, substituted or unsubstituted carboranes, substituted or unsubstituted metallocarboranes, phosphates, phosphites, polyoxometalates, substituted or unsubstituted carboxylates, triflates, triflimides and noncoordinating anions. Here, R can be hydrogen, alkyl, substituted alkyl, cycloalkyl, substituted cycloalkyl, heteroalkyl, heterocycloalkyl, substituted heterocycloalkyl, aryl, substituted aryl, heteroaryl, substituted heteroaryl, alkoxy aryloxy, acyl, silyl, boryl, phosphino, amino, thio, seleno and combinations thereof or halogen, in particular fluorine. Altering the combination of cations and anions makes it possible to give the ionic liquid the desired solvent properties for a specific thermoplastic polymer.

The cation can, for example, have a single five-membered ring which is not bound to other ring structures. An example is an imidazolium cation. In this case, the anion of the ionic liquid can be a halogen or pseudohalogen. For a further description, reference may be made to US-A-2005 0288 484, paragraphs [0055] to [0062].

Room temperature ionic liquids which can be used according to the invention are described, for example, in WO 02/079269 on pages 13 to 16. There, for example, large, asymmetric organic cations such as N-alkylpyridinium, alkylammonium, alkylphosphonium and N,N'-dialkylimidazolium are indicated as cations. The ionic liquids preferably have a high stability and particularly preferably have a decomposition temperature above 400° C. For example, dialkylimidazolium and alkylpyridinium have such high decomposition temperatures. Particular preference is given to using 1-alkyl-3-methylimidazolium salts, with, for example, $PF_6^-$ being a suitable counterion.

Further suitable ionic liquids are described in PCT/EP2007/060881 which has earlier priority and is not a prior publication.

For further descriptions of ionic liquids, reference may be made to Angew. Chem. 2000, 112, 3926 to 3945, K. N. Marsh et al., Fluid Phase Equilibria 219 (2004), 93 to 98 and J. G. Huddleston et al., Green Chemistry 2001, 3, 156 to 164, and also DE-A-102 02 838, WO 2005/019137, WO 2005/007657, WO 03/029329, WO 2004/084627, WO 2005/017001 and WO 2005/017252. For example, salts of 1,5-diazabicyclo[4.3.0]non-5-ene (DBN) and 1,4-diazabicyclo [5.4.0]undec-7-ene (DBU) are described in WO 2005/007657. In WO 2004/084627, for example, cyclic amine bases such as pyridinium, pyridazinium, pyrimidinium, pyrazinium, imidazolium, pyrazolium, oxazolium, 1,2,3- and 1,2,4-triazolium, thiazolium, piperidinium, pyrrolidinium, quinolinium and isoquinolinium are described as cations. Suitable counterions for 1,8-diazabicyclo[5.4.0]undec-7-enium (DBU) are, for example, chloride, methanesulfonate, formate, acetate, tosylate, trifluoroacetate, saccharinate, hydrogensulfate, lactathiocyanate and trifluoromethanesulfamate. The DBU ion can, for example, be substituted by $C_{1-12}$-alkyl radicals, in particular $C_{4-8}$-alkyl radicals. For example, it is possible to use 8-butyl-DBU or 8-octyl-DBU as cation. Further suitable ionic liquids are described in WO 2008/006422, EP-A-2 223 904, WO 2009/101032, WO 2006/048171, JP-A-2009-155436 and JP-A-2005-220316.

According to the invention, particular preference is given to using optionally substituted imidazolium cations, optionally substituted 1,8-diazabicyclo[5.4.0]undec-7-enium cations or mixtures thereof as cation in the ionic liquid. Possible substituents are, in particular, alkyl substituents, for example $C_{1-10}$-alkyl substituents. For imidazolium ions, preference is given to $C_{1-4}$-alkyl substituents, in particular ethyl and methyl substituents. In this case, ethylmethylimidazolium (EMIM) or methylmethylimidazolium (MMIM) is particularly preferably used as cation. Furthermore, preference can be given to using butylmethylimidazolium (BMIM) as cation. In the case of 1,8-diazabicyclo[5.4.0] undec-7-enium cations, preference is given to using $C_{3-10}$-alkyl substituents, in particular $C_{4-8}$-alkyl substituents. Particular preference is here given to 8-butyl-DBU and 8-octyl-DBU and mixtures thereof.

As anions for the imidazolium salts, it is possible to use the above-described anions. Preferred counterions are preferably selected from among halide, optionally substituted $C_{1-4}$-carboxylate, phosphate, $C_{1-4}$-alkylphosphate, di-$C_{1-4}$-alkylphosphate, $C_{1-4}$-alkylsulfonate, hydrogensulfate, $C_{1-4}$-alkylsulfate, triflimide, tetrafluoroborate, triflate and mixtures thereof.

The ionic liquid is particularly preferably ethylmethylimidazolium ethylsulfate, triflimide, tetrafluoroborate, triflate, diethylphosphate or a mixture thereof.

The ionic liquid can also comprise small proportions of water. For example, the water content of the ionic liquid can be from 0 to 5% by weight. The water content is preferably as low as possible.

In addition to the components A, B and C, the thermoplastic molding composition of the invention can additionally comprise a metal salt mixed with or dissolved in component C. The metal salt is preferably a metal salt which is soluble in the ionic liquid. The addition of metal salts enables the conductivity to be increased further. Suitable metal salts are, for example, described in EP-A-2 223 904. The metal salt is preferably selected from the group consisting of alkali metal salts of the anions bis(perfluoroalkylsulfonyl)amide and bis(perfluoroalkylsulfonyl)imide, bis (trifluoromethylsulfonyl)imide, alkyltosylates and aryltosylates, perfluoroalkyltosylates, nitrate, sulfate, hydrogensulfate, alkylsulfonates and arylsulfonates, polyether sulfates and polyether sulfonates, perfluoroalkylsulfates, sulfonates, alkylsulfonates and arylsulfonates, perfluorinated alkylsulfonates and arylsulfonates, alkylcarboxylates and arylcarboxylates, perfluoroalkylcarboxylates, perchlorate, tetrachloroaluminate, saccharinate, thiocyanate, isothiocyanate, dicyanamide, tetraphenylborate, tetrakis(pentafluorophenyl)borate, tetrafluoroborate, hexafluorophosphate, phosphate and polyether phosphate.

The amount of metal salt is not included in the above-mentioned amounts indicated for component C. When such a metal salt is concomitantly used, the proportion thereof, based on the component C depending on solubility, is preferably from 0 to 30% by weight.

For a combination of metal salts with ionic liquids, reference may be made to WO 2008/006422, in particular page 4, lines 6 to 11, and page 16.

Polymer Component A

As component A, at least one polyamide, copolyamide or polyamide-comprising polymer blend is used in the thermoplastic molding compositions of the invention.

The polyamides used according to the invention are prepared by reaction of starting monomers which are selected, for example, from among dicarboxylic acids and diamines or salts of the dicarboxylic acids and diamines, aminocarboxylic acids, aminonitriles, lactams and mixtures thereof. The starting monomers can be starting monomers of any polyamides, for example of aliphatic, partially aromatic or aromatic polyamides. The polyamides can be amorphous, crystalline or partially crystalline. The polyamides can also have any suitable viscosities or molecular weights. Polyamides having an aliphatic partially crystalline or partially aromatic or amorphous structure of any type are particularly suitable.

Such polyamides generally have a viscosity number of from 90 to 350 ml/g, preferably from 110 to 240 ml/g, determined in a 0.5% strength by weight solution in 96% strength by weight sulfuric acid at 25° C. in accordance with ISO 307.

Semicrystalline or amorphous resins having a molecular weight (weight average) of at least 5000, as are described, for example, in the U.S. Pat. Nos. 2,071,250, 2,071,251, 2,130,523, 2,130,948, 2,241,322, 2,312,966, 2,512,606 and 3,393,210, are preferred. Examples are polyamides which are derived from lactams having from 7 to 11 ring atoms, e.g. polycaprolactam and polycapryllactam, and also polyamides which are obtained by reaction of dicarboxylic acids with diamines.

As dicarboxylic acids, it is possible to use alkanedicarboxylic acids having from 6 to 12, in particular from 6 to 10, carbon atoms and aromatic dicarboxylic acids. Mention may here be made of adipic acid, azelaic acid, sebacic acid, dodecanedioic acid (=decanedicarboxylic acid) and terephthalic and/or isophthalic acid as acids.

Suitable diamines are, in particular, alkanediamines having from 2 to 12, in particular from 6 to 8, carbon atoms and also m-xylylenediamine, di($\alpha$-aminophenyl)methane, di(4-aminocyclohexyl)methane, 2,2-di(aminophenyl)propane or 2,2-di(4-aminocyclohexyl)propane and also p-phenylenediamine.

Preferred polyamides are polyhexamethyleneadipamide (PA 66) and polyhexamethylenesebacamide (PA 610), polycaprolactam (PA 6) and copolyamides 6/66, in particular those having a proportion of from 5 to 95% by weight of caprolactam units. PA 6, PA 66 and copolyamides 6/66 are particularly preferred.

In addition, mention may also be made of polyamides which can be obtained, for example, by condensation of 1,4-diaminobutane with adipic acid at elevated temperature (polyamide-4,6). Methods of preparing polyamides having this structure are described, for example, in EP-A 38 094, EP-A 38 582 and EP-A 39 524.

Further examples are polyamides which can be obtained by copolymerization of two or more of the abovementioned monomers, and mixtures of a plurality of polyamides in any mixing ratio.

Furthermore, partially aromatic copolyamides such as PA 6/6T and PA 66/6T having a triamine content of less than 0.5% by weight, preferably less than 0.3% by weight, (see EP-A 299 444) have been found to be particularly advantageous. The partially aromatic copolyamides having a low triamine content can be prepared by the method described in EP-A 129 195 and 129 196. For partially aromatic polyamides, reference may also be made to WO 2008/074687.

The following nonexhaustive listing comprises the abovementioned polyamides and also further polyamides suitable for the purposes of the invention (the monomers are indicated in parentheses):
PA 26 (ethylenediamine, adipic acid)
PA 210 (ethylenediamine, sebacic acid)
PA 46 (tetramethylenediamine, adipic acid)
PA 66 (hexamethylenediamine, adipic acid)
PA 69 (hexamethylenediamine, azelaic acid)
PA 610 (hexamethylenediamine, sebacic acid)
PA 612 (hexamethylenediamine, decanedicarboxylic acid)
PA 613 (hexamethylenediamine, undecanedicarboxylic acid)
PA 1212 (1,12-dodecanediamine, decanedicarboxylic acid)
PA 1313 (1,13-diaminotridecane, undecanedicarboxylic acid)
PA MXD6 (m-xylylenediamine, adipic acid)
PA TMDT (trimethylhexamethylenediamine, terephthalic acid)
PA 4 (pyrrolidone)
PA 6 ($\epsilon$-caprolactam)
PA 7 (ethanolactam)
PA 8 (capryllactam)
PA 9 (9-aminononanoic acid)
Polyphenylenediamine terephthalamide (p-phenylenediamine, terephthalic acid)

These polyamides and their preparation are known. A person skilled in the art can find details regarding their preparation in Ullmanns Encyklopädie der Technischen Chemie, 4th edition, vol. 19, pp. 39-54, Verlag Chemie, Weinheim 1980, and also Ullmanns Encyclopedia of Industrial Chemistry, Vol. A21, pp. 179-206, VCH Verlag, Weinheim 1992, and also Stoeckhert, Kunststofflexikon, pp. 425-428, Hanser Verlag, Munich 1992 (keyword "Polyimide" and the following).

Particular preference is given to using polyamide-6, polyamide-66 or MXD6-polyamide (adipic acid/m-xylylenediamine).

In addition, it is also possible according to the invention for functionalized compounds which are capable of bonding to carboxyl or amino groups and have, for example, at least one carboxyl, hydroxyl or amino group to be provided in the polyamides. These are preferably monomers which effect branching and have, for example, at least three carboxyl or amino groups,
monomers which are capable of bonding to carboxyl or amino groups, e.g. via epoxy, hydroxy, isocyanato, amino and/or carboxyl groups, and have functional groups selected from among hydroxyl, ether, ester, amide, imine, imide, halogen, cyano and nitro groups, C—C double or triple bonds,
or polymer blocks which are capable of bonding to carboxyl or amino groups, for example poly-p-aramid oligomers.

The use of the functionalized compounds enables the property spectrum of the polyamides prepared to be set freely within a wide range.

For example, triacetonediamine compounds can be used as functionalizing monomers. Preference is given to 4-amino-2,2,6,6-tetramethylpiperidine or 4-amino-1-alkyl-2,2,6,6-tetramethylpiperidine in which the alkyl group has from 1 to 18 carbon atoms or is replaced by a benzyl group. The triacetonediamine compound is present in an amount of preferably from 0.03 to 0.8 mol %, particularly preferably from 0.06 to 0.4 mol %, in each case based on 1 mol of acid amide groups of the polyamide. For a further description, reference may be made to DE-A-44 13 177.

As further functionalizing monomers, it is also possible to use the compounds which are usually used as regulators, e.g. monocarboxylic acids and dicarboxylic acids. For a description, reference may likewise be made to DE-A-44 13 177.

In addition to one or more polyamides or copolyamides, component A can also comprise at least one further blend polymer. Here, the proportion of the blend polymer in component A is preferably from 0 to 60% by weight, particularly preferably from 0 to 50% by weight, in particular from 0 to 40% by weight. When a blend polymer is present, the minimum amount thereof is preferably 5% by weight, particularly preferably at least 10% by weight.

As blend polymers, it is possible to use, for example, natural or synthetic rubbers, acrylate rubbers, polyesters, polyolefins, polyurethanes or mixtures thereof, optionally in combination with a compatibilizer.

As synthetic rubbers which can be used, mention may be made of ethylene-propylene-diene rubber (EPDM), styrene-butadiene rubber (SBR), butadiene rubber (BR), nitrile rubber (NBR), hydrin rubber (ECO), acrylate rubbers (ASA). Silicone rubbers, polyoxyalkylene rubbers and other rubbers can also be used.

As thermoplastic elastomers, mention may be made of thermoplastic polyurethane (TPU), styrene-butadiene-styrene block copolymers (SBS), styrene-isoprene-styrene block copolymers (SIS), styrene-ethylene-butylene-styrene block copolymers (SEBS) or styrene-ethylene-propylene-styrene block copolymers (SEPS).

Furthermore, it is possible to use resins, for example urethane resins, acrylic resins, fluoro resins, silicone resins, imide resins, amidimide resins, epoxy resins, urea resins, alkyd resins or melamine resin, as blend polymers.

Further possible blend polymers are ethylene copolymers, for example copolymers of ethylene and 1-octene, 1-butene or propylene, as are described in WO 2008/074687. The molecular weights of such ethylene-α-olefin copolymers are preferably in the range from 10 000 to 500 000 g/mol, more preferably from 15 000 to 400 000 g/mol (number average molecular weight). It is also possible to use pure polyolefins such as polyethylene or polypropylene.

As regards suitable polyurethanes, reference may be made to EP-B-1 984 438, DE-A-10 2006 045 869 and EP-A-2 223 904.

Further suitable thermoplastic resins are indicated in JP-A-2009-155436, paragraph [0028].

Carbon Nanotubes Component B

As component B, use is made of carbon nanotubes, graphenes or mixtures thereof. Suitable carbon nanotubes and graphenes are known to those skilled in the art. For a description of suitable carbon nanotubes (CNTs), reference may be made to DE-A-102 43 592, in particular paragraphs [0025] to [0027], also EP-A-2 049 597, in particular page 16, lines 11 to 41, or DE-A-102 59 498, paragraphs [0131] to [0135]. Suitable carbon nanotubes are also described in WO 2006/026691, paragraphs [0069] to [0074]. Suitable carbon nanotubes are additionally described in WO 2009/000408, page 2, line 28 to page 3, line 11.

For the purposes of the present invention, carbon nanotubes are carbon-comprising macromolecules in which the carbon has (mainly) a graphite structure and the individual graphite layers are arranged in the form of a tube. Nanotubes and their synthesis are already known in the literature (for example, J. Hu et al., Acc. Chem. Res. 32 (1999), 435-445). For the purposes of the present invention, essentially any type of nanotubes can be used.

The diameter of the individual tubular graphite layers (graphite tubes) is preferably from 4 to 20 nm, in particular from 5 to 10 nm. Nanotubes can in principle be divided into single-walled nanotubes (SWNTs) and multiwalled nanotubes (MWNTs). In the MWNTs, a plurality of graphite tubes are therefore nested within one another.

Furthermore, the external shape of the tubes can vary and can have a uniform diameter inside and outside, but knot-like tubes and worm-like structures (vermicular) can also be produced.

The aspect ratio (length of the respective graphite tube to the diameter thereof) is at least >10, preferably >5. The nanotubes have a length of at least 10 nm. For the purposes of the present invention, MWNTs are preferred as component B). In particular, the MWNTs have an aspect ratio of about 1000:1 and an average length of about 10 000 nm.

The specific surface area determined by the BET method is generally from 50 to 2000 $m^2/g$, preferably from 200 to 1200 $m^2/g$. The impurities (e.g. metal oxides) formed in catalytic production are generally, as determined by HRTEM, from 0.1 to 12%, preferably from 0.2 to 10%.

Suitable nanotubes can be procured under the name "multiwall" from Hyperion Catalysis Int., Cambridge Mass. (USA) (see also EP 205 556, EP 969 128, EP 270 666, U.S. Pat. No. 6,844,061).

In the production process according to the invention, no pretreatment or surface modification of the carbon nanotubes is necessary. In particular, one embodiment of the invention provides for no surface modification of the carbon nanotubes by means of silanes or silicone oils, in particular no modification by means of silane bonding agents or silicone oils as are described in JP-A-2009-155436, to be carried out.

Suitable graphenes are, for example, described in Macromolecules 2010, 43, pages 6515 to 6530.

The thermoplastic molding compositions of the invention can also comprise further additives such as further fillers, e.g. glass fibers, stabilizers, oxidation inhibitors, agents against thermal decomposition and decomposition by ultra-violet light, lubricants and mold release agents, colorants such as dyes and pigments, nucleating agents, plasticizers, etc. These further additives are typically present in amounts of from 0 to 50% by weight, preferably from 0 to 35% by weight. For a more detailed description of possible additives, reference may be made to WO 2008/074687, pages 31 to 37.

The thermoplastic molding compositions of the invention are produced by extrusion processes at a temperature which is preferably in the range from 170 to 350° C., particularly preferably from 200 to 300° C.

It is possible to use, for example, a process as described in DE-A-10 2007 029 008. Reference may also be made to WO 2009/000408 for a production process.

The thermoplastic molding compositions are preferably produced in a corotating twin-screw extruder in which the components B and C are introduced into component A.

The component B can be introduced as powder or in the form of a masterbatch into the thermoplastic molding composition. The introduction of the ionic liquid of the component C can be carried out independently of the introduction of the conductive filler of the component B, for example in the "hot feed" of the extruder. As an alternative, a masterbatch comprising component C can be used.

The further processing of the thermoplastic molding composition can be carried out by known methods, for example by injection molding or pressing in a mold.

The process of the invention allows the production of thermoplastic molding compositions which are filled with the carbon fillers of the component B and have a low energy consumption combined with good degrees of dispersion.

The production process according to the invention makes the thermoplastic molding compositions or moldings produced therefrom antistatic or conductive. For the purposes of the present invention, "antistatic" means volume resistances of from $10^9$ to $10^6$ ohm cm. "Conductive" means volume resistances of less than $10^6$ ohm cm.

Without wishing to be tied to this theory, conductive thermoplastic molding compositions can, in particular, be obtained when the concentration of the component B is in the vicinity of the percolation concentration. At this concentration, a network of carbon nanotubes (or graphenes) is preferably formed within the polymer matrix. This means that the individual carbon nanotubes or grapheme particles are in contact with one another in the polymer matrix, so that they form a continuous path through the material. The conductivity can be significantly increased further by the addition of ionic liquid.

The thermoplastic molding compositions of the invention are used, in particular, for producing conductive moldings.

The invention also provides moldings composed of the above-described thermoplastic composition.

The invention is illustrated by the following examples.

EXAMPLES

The following starting materials were used for producing the thermoplastic molding composition:
Thermoplastic matrix:
A1: Polyamide-6 having a viscosity number (VN) of 150 ml/g
A2: Polyethylene (LDPE) having an MFR of 0.75 g/10 min
Conductive Filler:
B: Carbon nanotubes Nanocyl® NC7000 in the form of a 15% strength by weight masterbatch in polyamide-6

The carbon nanotubes have a purity of 90%, an average diameter of 9.5 nm and an average length of 1.5 µm. The surface area determined by the BET method was from 250 to 300 m$^2$/g.
Ionic Liquids:
The ionic liquids used were:
C1: 1-Ethyl-3-methylimidazolium triflimide (CAS No. 174899-82-2)
C2: 1-Ethyl-3-methylimidazolium ethylsulfate (CAS No. 342573-75-5)
C3: 1-Ethyl-3-methylimidazolium tetrafluoroborate (CAS No. 143314-16-3)
C4: 1-Ethyl-3-methylimidazolium triflate (CAS No. 145022-44-2)
Characterization Methods:

The viscosity number of the polyamide VN was determined in accordance with ISO 307 in a 0.5% strength by weight solution in 96% strength by weight sulfuric acid at 25° C. The MFR of polyethylene was determined in accordance with ISO 1133 at 190° C. under a load of 2.16 kg.

The electrical conductivity was determined as volume conductivity using a 4-point measuring apparatus. For each plate, the measurement was carried out on five specimens having the dimensions 77×12×4 mm$^3$ which had been sawn from cured plates. To achieve good contact between specimen and electrodes, four silver electrodes were painted directly on the specimen using a conductive silver paste (Leitsilber 200 from Hans Wohlbring GmbH). A Current Source 225 was used as current source, a Programmable Electrometer 617 was used as voltage measuring instrument and a Multimeter 1000 was used as current measuring instrument, in each case from Keithley Instruments.

The production of the carbon-filled molding compositions was carried out on a ZSK18 extruder from Coperion having a screw diameter of 18 mm. The extruder had eleven zones, with the polymer being introduced cold into zones 0 and 1. Zones 2 and 3 served for melting and transport. The ionic liquid was fed into zone 4. The subsequent zones 5 and 6 served for dispersion, with part of zone 6 together with zone 7 also serving for homogenization. Redispersion was carried out in zones 8 and 9. A zone 10 for degassing and a zone 11 for discharge followed.

The ionic liquid was introduced into zone 4 as hot feed using a gear pump. The extruder throughput was set to 5 kg/h and the screw speed was kept constant at 400 rpm. The extrusion temperature was 260° C. The make-up of the molding compositions is shown in table 1 below. The products were pelletized and processed further by injection molding. Injection molding was carried out on an Arburg 420T at a melt temperature of 260° C. and a mold temperature of 80° C.

The make-ups and electrical properties are shown in table 1 below.

TABLE 1

|  |  | % by wt. |  |  |  | % by wt. |  | % by wt. |  | % by wt. | Volume resistance [ohm * cm] |
|---|---|---|---|---|---|---|---|---|---|---|---|
| Ref. 1 | A1 | 95 | — | — | B | 5 | — | — | 3.14E+10 |
| Ref. 2 | A1 | 97 | — | — | B | 3 | — | — | 2.70E+12 |
| Ref. 3 | A1 | 98 | — | — | B | 2 | — | — | 1.50E+12 |
| Ref. 4 | A1 | 67 | A2 | 30 | B | 3 | — | — | 1.88E+07 |
| Ref. 5 | A1 | 100 | — | — | — | — | — | — | 8.81E+13 |
| Ref. 6 | A1 | 97 | — | — | — | — | C1 | 3 | 1.24E+10 |
| Ref. 7 | A1 | 97 | — | — | — | — | C2 | 3 | 2.72E+09 |
| Ref. 8 | A1 | 97 | — | — | — | — | C3 | 3 | 1.48E+09 |
| Ref. 9 | A1 | 97 | — | — | — | — | C4 | 3 | 4.26E+09 |
| Ex. 1 | A1 | 96 | — | — | B | 3 | C1 | 1 | 1.16E+06 |
| Ex. 2 | A1 | 96 | — | — | B | 3 | C3 | 1 | 2.53E+05 |
| Ex. 3 | A1 | 96 | — | — | B | 3 | C4 | 1 | 6.02E+05 |
| Ex. 4 | A1 | 96 | — | — | B | 3 | C2 | 1 | 1.60E+06 |
| Ex. 5 | A1 | 96.5 | — | — | B | 3 | C2 | 0.5 | 3.02E+08 |
| Ex. 6 | A1 | 97 | — | — | B | 2 | C2 | 1 | 1.64E+10 |
| Ex. 7 | A1 | 97.5 | — | — | B | 2 | C2 | 0.5 | 1.45E+11 |
| Ex. 8 | A1 | 66 | A2 | 30 | B | 3 | C2 | 1 | 2.41E+04 |

Reference example 2 serves for comparison with examples 1 to 5 which have the same content of carbon nanotubes. The volume resistance is greatly reduced by addition of the ionic liquid.

Reference example 3 serves for comparison with examples 6 and 7. The volume resistance is likewise greatly reduced by addition of the ionic liquid.

Reference example 4 serves for comparison with example 8. The volume resistance is reduced by a factor of almost 1000.

Reference example 5 gives the volume resistance for a pure polyimide. Reference examples 6 to 9 provide comparative molding compositions which contain an ionic liquid in an amount of 3% by weight but no carbon nanotubes. The volume resistance is in each case significantly higher than the volume resistance of the corresponding molding composition according to the invention which contains the same ionic liquid in a significantly smaller amount but also contains carbon nanotubes.

The invention claimed is:
1. A thermoplastic molding composition consisting of:
a) at least one polyamide or copolyamide as component A,
b) from 0.5 to 4% by weight of carbon nanotubes having a diameter in the range of 4 to 20 nm and a specific surface area, determined by the BET method, in the range from 50 to 2000 m$^2$/g, graphenes or mixtures thereof as component B,
c) from 0.3 to 1.2% by weight of ionic liquids as component C,
wherein percentages are based on the thermoplastic molding composition, the thermoplastic molding composition does not have any polyamide-12 units, and
wherein the polyamide or copolyamide is prepared by reaction of starting monomers consisting of monomers selected from the group consisting of dicarboxylic acids and diamines or salts of the dicarboxylic acids and diamines, amino-carboxylic acids, aminonitriles, lactams, and mixtures thereof;

wherein component A is selected from the group consisting of polyamide 6, polyamide 66, and MXD6-polyamide.

2. The thermoplastic molding composition according to claim 1, wherein the ionic liquid having a cation selected from the group consisting of:
  quaternary ammonium cations,
  phosphonium cations,
  imidazolium cations,
  H-pyrazolium cations,
  pyridazinium ions,
  pyrimidinium ions,
  pyrazinium ions,
  pyrrolidinium cations,
  guanidinium cations,
  5- to at least 6-membered cations comprising at least one phosphorus or sulfur atom,
  1,8-diazabicyclo[5.4.0]undec-7-enium cation,
  1,8-diazabicyclo[4.3.0]non-5-inium cation, and
  oligomers and polymers comprising these cations.

3. The thermoplastic molding composition according to claim 1, wherein the ionic liquid having an anion selected from the group consisting of halide, optionally substituted $C_{1-4}$-carboxylate, phosphate, $C_{1-4}$-alkylphosphate, di-$C_{1-4}$-alkylphosphate, $C_{1-4}$-alkylsulfate, $C_{1-4}$-alkylsulfonate, hydrogensulfate, triflimide, tetrafluoroborate, triflate and mixtures thereof.

4. The thermoplastic molding composition according to claim 1, wherein the carbon nanotubes have a diameter in the range of 5 to 10 nm.

5. The thermoplastic molding composition according to claim 1, wherein the carbon nanotubes have a specific surface area, determined by the BET method, in the range from 200 to 1200 $m^2/g$.

6. The thermoplastic molding composition according to claim 1, wherein the carbon nanotubes are multiwalled nanotubes in which a plurality of graphite tubes are nested within one another.

7. A molding comprising the thermoplastic molding composition according to claim 1.

8. A process for producing thermoplastic molding compositions according to claim 1, comprising introducing components B and C into component A in a corotating twin-screw extruder.

9. The process according to claim 8, wherein extrusion is carried out at a temperature in the range from 170 to 350° C.

* * * * *